US012246883B2

(12) United States Patent
Ruddell et al.

(10) Patent No.: US 12,246,883 B2
(45) Date of Patent: Mar. 11, 2025

(54) BAG CUTTING AND CLAMPING ASSEMBLY

(71) Applicants: Gregory Roy Ruddell, Aldergrove (CA); Robert J. Halas, Osoyoos (CA)

(72) Inventors: Gregory Roy Ruddell, Aldergrove (CA); Robert J. Halas, Osoyoos (CA); Johnson Ling, Richmond (CA)

( * ) Notice: Subject to any disclaimer, the term of this patent is extended or adjusted under 35 U.S.C. 154(b) by 0 days.

(21) Appl. No.: 18/247,409

(22) PCT Filed: Oct. 1, 2021

(86) PCT No.: PCT/CA2021/051373
§ 371 (c)(1),
(2) Date: Mar. 30, 2023

(87) PCT Pub. No.: WO2022/067443
PCT Pub. Date: Apr. 7, 2022

(65) Prior Publication Data

US 2023/0406575 A1 Dec. 21, 2023

Related U.S. Application Data

(60) Provisional application No. 63/086,883, filed on Oct. 2, 2020.

(51) Int. Cl.
*B65D 33/16* (2006.01)
*B26D 1/04* (2006.01)
(Continued)

(52) U.S. Cl.
CPC ......... *B65D 33/1675* (2013.01); *B26D 1/045* (2013.01); *B26D 7/025* (2013.01); *B65D 45/16* (2013.01)

(58) Field of Classification Search
CPC .. B26D 1/0145; B26D 7/025; B65D 33/1675; B65D 45/16; Y10T 24/15
See application file for complete search history.

(56) References Cited

U.S. PATENT DOCUMENTS 107,248 A * 9/1870 Goodfellow ........... B26D 7/025 83/454
234,476 A 11/1880 Hood
(Continued)

FOREIGN PATENT DOCUMENTS

DE 9104600 U1 6/1991
DE 202006003686 U1 7/2006
(Continued)

OTHER PUBLICATIONS

International Search Report for corresponding PCT/CA2021/051373, mailed Jan. 24, 2022, 3 pages.
(Continued)

*Primary Examiner* — Robert Sandy
(74) *Attorney, Agent, or Firm* — Larsen IP, PLLC; James C. Larsen

(57) ABSTRACT

There is provided a bag cutting and clamping assembly. The assembly includes a reciprocating blade. The assembly includes a pair of jaw members pivotally coupled together at first ends thereof and selectively couple together at second ends thereof. One of the jaw members forms a channel via which the reciprocating blade extends for selectively cutting a portion of the bag. The jaw members include a clamping mechanism for selectively clamping the bag and which is axially spaced-apart from the channel.
There is also provided a bag cutting and clamping assembly according to another aspect. The assembly includes a bag cutter with a handle end portion reciprocatingly coupled to a first said jaw member, a tongue end portion slidably received within an elongate groove of a second said jaw member, and one or more blades between the handle end portion thereof and the tongue end portion thereof.

34 Claims, 11 Drawing Sheets

(51) Int. Cl.
*B26D 7/02* (2006.01)
*B65D 45/16* (2006.01)

(56) References Cited

U.S. PATENT DOCUMENTS

| | | | | |
|---|---|---|---|---|
| 237,280 | A * | 2/1881 | Hoopes et al. | B26D 7/025 83/485 |
| 381,265 | A | 4/1888 | Martens | |
| 614,407 | A | 11/1898 | Morrison et al. | |
| 1,895,754 | A | 1/1933 | Finkenwirth | |
| 2,420,460 | A | 5/1947 | Bowdoin et al. | |
| 2,585,421 | A | 2/1952 | Armand | |
| 2,679,098 | A | 5/1954 | Deicken | |
| 3,774,251 | A | 11/1973 | Pellman | |
| 4,296,529 | A | 10/1981 | Brown | |
| 4,580,342 | A | 4/1986 | Beuzart | |
| 4,716,886 | A | 1/1988 | Schulman et al. | |
| D299,008 | S | 12/1988 | Naslund | |
| 4,831,717 | A | 5/1989 | Mead et al. | |
| 4,831,734 | A | 5/1989 | de Ruyter | |
| 4,847,956 | A | 7/1989 | Levine | |
| 5,014,431 | A | 5/1991 | Jebe et al. | |
| 5,069,097 | A | 12/1991 | Mori | |
| 5,167,608 | A | 12/1992 | Steffens, Jr. et al. | |
| 5,347,671 | A | 9/1994 | Hunts | |
| 5,428,871 | A | 7/1995 | Iosif | |
| D375,045 | S | 10/1996 | Weber et al. | |
| 5,604,959 | A | 2/1997 | Bowen | |
| 5,617,616 | A | 4/1997 | Cutts, Sr. | |
| 5,713,108 | A | 2/1998 | Solomon et al. | |
| D391,851 | S | 3/1998 | Joergensen | |
| 5,802,677 | A | 9/1998 | Dorman et al. | |
| 5,860,215 | A | 1/1999 | Roskam et al. | |
| 5,996,237 | A | 12/1999 | Sanders | |
| D420,912 | S | 2/2000 | Vaught | |
| D423,353 | S | 4/2000 | Blanchard et al. | |
| 6,058,572 | A | 5/2000 | Folkmar | |
| 6,105,217 | A | 8/2000 | Caradine et al. | |
| D431,004 | S | 9/2000 | Naslund | |
| D447,691 | S | 9/2001 | Messer | |
| 6,286,999 | B1 | 9/2001 | Cappel et al. | |
| 6,363,588 | B1 | 4/2002 | Caradine | |
| 6,578,243 | B1 | 6/2003 | Hall | |
| D482,968 | S | 12/2003 | Henriksson | |
| 6,805,485 | B2 | 10/2004 | Hogan et al. | |
| 6,904,646 | B2 | 6/2005 | Reynolds | |
| 7,131,169 | B2 | 11/2006 | Folkmar | |
| 7,181,806 | B2 | 2/2007 | Folkmar | |
| 7,284,303 | B2 | 10/2007 | Canegallo et al. | |
| D566,511 | S | 4/2008 | Seehoff et al. | |
| RE40,756 | E | 6/2009 | Hall | |
| D642,913 | S | 8/2011 | Osborn et al. | |
| 8,572,814 | B2 | 11/2013 | Clearman | |
| 9,242,766 | B2 | 1/2016 | Ruddell et al. | |
| 2005/0016668 | A1 | 1/2005 | Powers et al. | |
| 2005/0063616 | A1 | 3/2005 | Chang | |
| 2006/0156885 | A1* | 7/2006 | Wu | B26D 5/02 83/485 |
| 2013/0305540 | A1* | 11/2013 | Ruddell | B65D 33/00 24/30.5 R |

FOREIGN PATENT DOCUMENTS

| | | | |
|---|---|---|---|
| WO | 02076836 A2 | 10/2002 |
| WO | 2005012123 A1 | 2/2005 |
| WO | 2014029408 A1 | 2/2014 |
| WO | 2014111675 A1 | 7/2014 |

OTHER PUBLICATIONS

Written Opinion in corresponding PCT/CA2021/051373, mailed Jan. 24, 2022, 3 pages.

* cited by examiner

BAG CUTTING AND CLAMPING ASSEMBLY

This application is a 371 national stage entry of pending PCT Application No. PCT/CA2021/051373 having a filing date of Oct. 1, 2021. PCT/CA2021/051373 claims benefit of priority to U.S. Provisional Patent Application No. 63/086,883 filed Oct. 2, 2020. All of the above applications are incorporated herein by reference.

BACKGROUND OF THE INVENTION

Field of the Invention

There is provided a cutting and clamping assembly. In particular, there is provided a bag cutting and clamping assembly.

Description of the Related Art

U.S. Pat. No. 6,578,243 to Hall discloses a bag clamp for closing and cutting a polymer bag. The clamp includes two opposed upper and lower clamp members which are movable between a closed and open condition. Each one of the clamp members has an inner, an outer surface, and a gripping means disposed on the inner surface thereof. The gripping means is for gripping the bag. The gripping means includes a plurality of internal ridges disposed on the inner surface of each one of the clamp members. Each one of the clamp members possesses a mouth end for engagement of a bag surface, a grasping end for grasping by a user and a hinge attaching the clamp members to each other. The hinge attaches to each clamp member inner surface at a location between the mouth end and the grasping end thereof. The hinge is biased by a spring clip. Each of the clamp member mouth ends possesses a lip for aiding in positioning the bag in the clamp. The clamp includes a cutting means disposed on the inner surface of the upper clamp member. The cutting means is comprised of a cutting blade, a springboard button, and a blade guard. The clamp includes a split anvil means disposed on the inner surface of the lower clamp member. The split anvil means is disposed in such a manner that the split anvil means is directly opposite the cutting means when the upper clamp member and said lower clamp member are in a closed position.

U.S. Pat. No. 9,242,766 to Ruddell et al. discloses a bag clamp including a first jaw member and an opening in a clamping surface of the first jaw member. The bag clamp includes a second jaw member. The bag clamp includes a hinge coupling the first jaw member and the second jaw member. The bag clamp includes a cutting blade reciprocatingly movable along the second jaw member. The clamp has an open configuration in which the first jaw member and the second jaw member are angularly spaced-apart. The bag clamp is movable from the open configuration to a closed configuration in which the blade is received by the opening in the first jaw member and the blade is moveable along the second jaw member. The bag clamp includes a releasable locking mechanism for locking the clamp in the closed configuration. The cutting blade is pivotable and bi-directional.

U.S. Pat. No. 1,080,772 to Ruddell et al. discloses a bag clamp used to open a sealed bag and releasably seal the opened bag. The bag clamp includes a first elongate jaw member having a first end, a second end, a planar clamping surface and an opening extending along a length of the planar clamping surface. The bag clamp includes a second elongate jaw member having a first end, a second end, and a planar clamping surface. The bag clamp includes a hinge coupling the first end of the first elongate jaw member and the first end of the second elongate jaw member. The bag clamp has an open configuration in which the first elongate jaw member and the second elongate jaw member are angularly spaced-apart. The bag clamp is moveable from the open configuration to a closed configuration in which the opening in the planar clamping surface of the first elongate jaw member is aligned with the blade reciprocatingly mounted to the second elongate jaw member. The bag clamp includes a releasable locking mechanism for locking the clamp in the closed configuration. The releasable locking mechanism is disposed at the second end of the first elongate jaw member and the second end of the second elongate jaw member. The releasable locking mechanism releasably connects the second end of the first elongate jaw member and the second end of the second elongate jaw member. The bag clamp includes a cutting mechanism with a blade reciprocatingly mounted on a guide rod disposed within the second elongate jaw member. The blade is reciprocable along a length of the second elongate jaw member. The blade has a retracted position in which the blade is disposed within the second elongate jaw member. The blade is moveable from the retracted position to an extended position in which the blade extends through the opening in the planar clamping surface of the first elongate jaw member.

BRIEF SUMMARY OF INVENTION

There is provided, and it is an object to provide, an improved bag cutting and clamping assembly.

There is provided a bag cutting and clamping assembly according to a first aspect. The assembly includes a reciprocating blade. The assembly includes a pair of jaw members pivotally coupled together at first ends thereof. The jaw members selectively couple together at second ends thereof. At least one of the jaw members forms a channel via which the reciprocating blade extends for selectively cutting a portion of the bag. The jaw members include a clamping mechanism for selectively clamping the bag. The clamping mechanism is axially spaced-apart from the channel.

There is also provided a bag cutting and clamping assembly according to a second aspect. The assembly includes a cutting mechanism via which a bag is selectively cut. The assembly includes a pair of jaw members pivotally coupled together at first ends thereof. The jaw members selectively couple together at second ends thereof. The jaw members have a first clamping region and a second clamping region laterally spaced-apart from the first clamping region. The cutting mechanism is reciprocatingly mounted to a first said jaw member and extends into a second said jaw member adjacent the first clamping region.

There is further provided a bag cutting and clamping assembly according to a third aspect. The assembly includes a pair of jaw members pivotally coupled together at first ends thereof. The jaw members selectively couple together at second ends thereof. The jaw members form a first pair of clamping surfaces, a second pair of clamping surfaces and a third pair of clamping surfaces. The assembly includes a cutting mechanism via which a bag is selectively cut. The cutting mechanism is reciprocatingly mounted to a first of the jaw members. The cutting mechanism extends into a second of the jaw members between the first pair of clamping surfaces of the jaw members and the second pair of clamping surfaces of the jaw members. The third pair of clamping surfaces of the jaw members are laterally spaced-apart from the cutting mechanism.

There is additionally provided a bag cutting and clamping assembly according to a fourth aspect. The assembly includes a cutting mechanism via which a bag is selectively cut. The assembly includes a pair of jaw members pivotally coupled together at first ends thereof. The jaw members selectively couple together at second ends thereof. The cutting mechanism reciprocatingly mounts to a first of the jaw members. A second of the jaw members forms a cutting channel into which the cutting mechanism at least partially extends. One of the jaw members forms a clamping channel via which the portions of the bag selectively clamp together at least in part. The clamping channel is laterally spaced-apart from the cutting channel.

There is yet also provided a bag cutting and clamping assembly according to a fifth aspect. The assembly includes a pair of jaw members pivotally coupled together at first ends thereof. The jaw members selectively couple together at second ends thereof to seal a bag. The assembly includes a bag cutter. The bag cutter includes a handle end portion reciprocatingly coupled to a first of the jaw members. The bag cutter includes a tongue end portion slidably received within an elongate groove of a second of the jaw members. The bag cutter includes one or more blades between the handle end portion thereof and the tongue end portion thereof.

There is yet further provided a bag cutting and clamping assembly according to a sixth aspect. The assembly includes a pair of jaw members pivotally coupled together at first ends thereof. The jaw members selectively couple together at second ends thereof to seal a bag. The assembly includes a bag cutter. The bag cutter includes a first end portion reciprocatingly coupled to a first of the jaw members. The bag cutter includes a second end portion slidably coupled to a second of the jaw members when the second ends of the jaw members are coupled together. The bag cutter includes one or more blades. The end portions of the bag cutter are shaped to inhibit access to the one or more blades.

There is yet additionally provided a bag cutting and clamping assembly according to a seventh aspect. The assembly includes a pair of jaw members pivotally coupled together at first ends thereof. The jaw members selectively couple together at second ends thereof to seal a bag. The assembly includes a bag cutter. The bag cutter reciprocatingly couples to a first of the jaw members via at least one elongate tongue of a first of a first of the jaw members and the bag cutter, and at least one elongate groove of a second of the first of the jaw members and the bag cutter. The bag cutter slidably couples to a second of the jaw members via at least one of elongate tongue of a first of the second of the jaw members and the bag cutter, and at least one elongate groove of a second of the second of the jaw members and the bag cutter.

There is also provided a bag cutting and clamping assembly according to an eighth aspect. The assembly includes a pair of jaw members extending along a longitudinal axis. The jaw members are pivotally coupled together at first ends thereof and selectively coupling together via second ends thereof. The jaw members include at least one pair of clamping surfaces which abut each other when the second ends of the jaw members are coupled together. A first of the clamping surfaces is outwardly convex. The assembly includes a cutting mechanism via which a bag is selectively cut. The cutting mechanism reciprocatingly mounts and is axially moveable relative to a first of the jaw members and extends into a cutting channel formed by a second of the jaw members.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
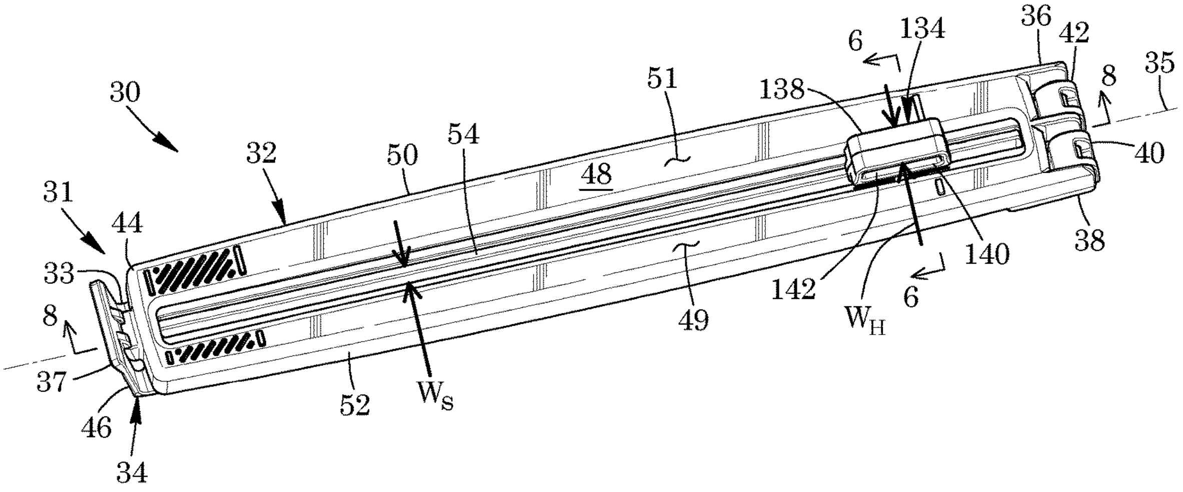
FIG. 1 is a top, left side perspective view of a bag cutting and clamping assembly according to one aspect, the assembly including first and second jaw members shown in a closed, clamped position, and the assembly further including a bag cutter reciprocatingly mounted to the jaw members.

Referring to the drawings and first to FIG. 1, there is shown a bag cutting and clamping assembly 30.

Figure 2:
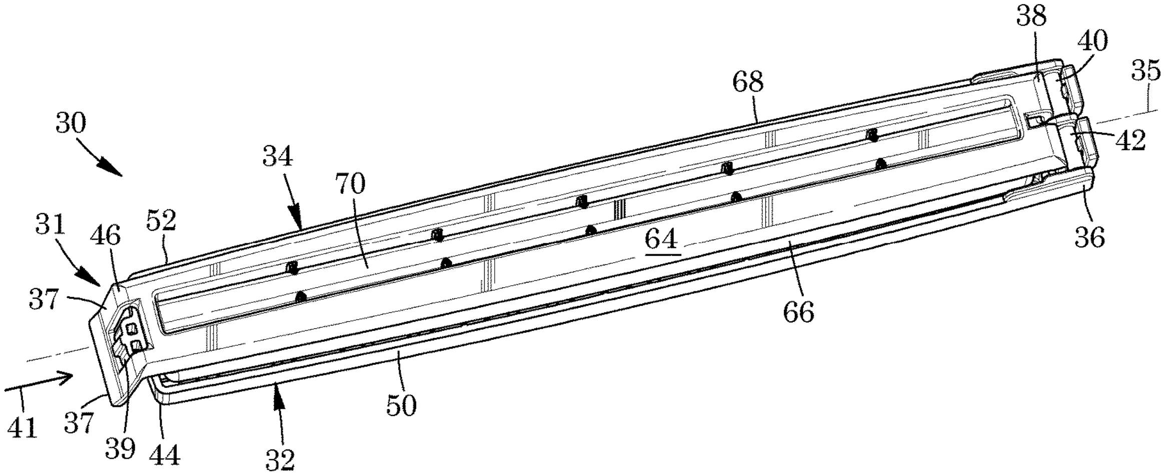
FIG. 2 is a bottom, right side perspective view thereof.

The assembly includes a pair of elongate jaw members, in this example a first jaw member 32 seen in FIG. 1 and a second jaw member 34 seen in FIG. 2. The jaw members are made of a material that is resilient at least in part in this example, in this case being made of a polymer or elastomer, in this example plastic. However, this is not strictly required and the jaw members 32 and 34 may be made of other materials in other embodiments. The assembly 30 has a longitudinal axis 35 along which the jaw members extend and align. As seen in FIG. 1, the jaw members 32 and 34 pivotally couple together at first or proximal ends 36 and 38 thereof in this example via at least one and in this example a pair of hinges 40 and 42.

Figure 3:
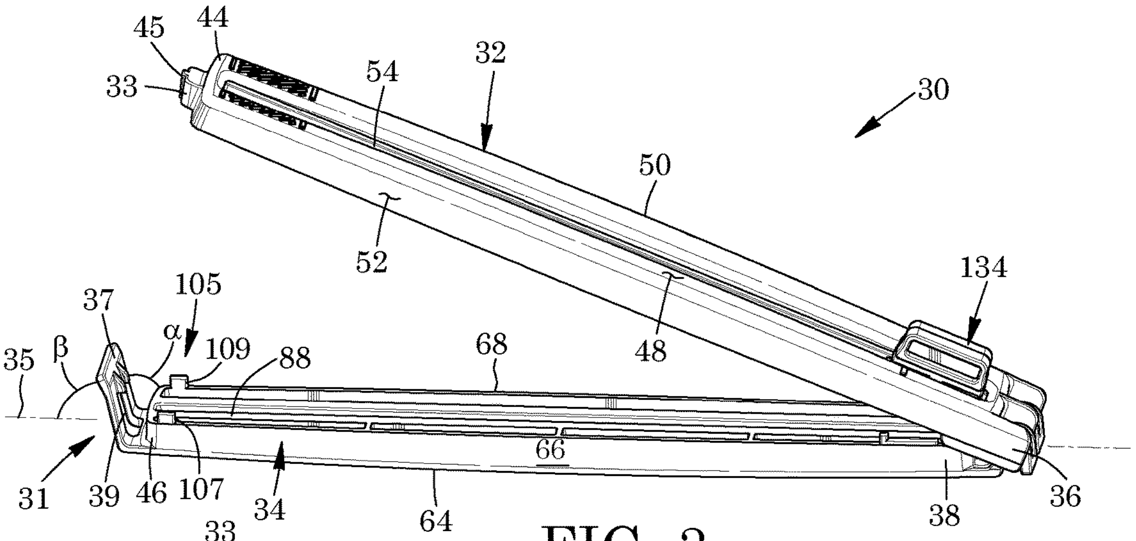
FIG. 3 is a left side, top perspective view thereof, with the jaw members of the assembly of FIG. 1 shown in a partially open, unclamped position.

The jaw members 32 and 34 selectively couple together at second or distal ends 44 and 46 thereof via a locking mechanism 31, which may be referred to as a distal end locking mechanism. As seen in FIG. 3, in this example the locking mechanism includes a protrusion 33 coupled to and integrally formed with distal end 44 of the first jaw member 32. The protrusion is semi-obround in shape in this case with distal and centrally positioned, elongate protuberance 45 extending outwards from the semi-obround shape; however this is not strictly required and the protrusion may have other shapes in other embodiments.

Still referring to FIG. 3, the locking mechanism 31 includes a resilient flange or catch 37 coupled to, integrally formed with and extending angularly outwards from distal end 46 of the second jaw member 34 in this example. The catch is generally rectangular in profile in this example. The catch 37 extends outwards from the distal end of the second jaw member at an angle α which is an acute angle in this example. The catch extends outwards from the second jaw member 34 at an angle β relative to the longitudinal axis 35 of the assembly 30, with angle β also being acute in this example. The catch 37 includes a recess, in this example an aperture 39 extending therethrough. The aperture has a shape that generally mirrors that of the outer profile of protrusion 33 at least in part. The catch 37 is shaped to selectively couple with protrusion 33, with the protrusion being received at least partially within aperture 39 when the catch is biased inwards, as shown by arrow 41 in FIG. 12.

Still referring to FIG. 3, there is provided a second locking mechanism 105 comprising at least one, and in this example a pair of catches 107 and 109. The catches are coupled to, integrally formed with and extend outwards from side walls 66 and 68 of the second jaw member 34 in this example. The catches 107 and 109 are resilient and shaped to bias outwardly, and selectively bias inwardly, to snugly abut against the inner surfaces 113 and 111 of side walls 52 and 50 of the first jaw member 30 seen in FIG. 4, respectively, when the first and second jaw members are in the closed, clamped position seen in FIG. 1.

Referring back to FIGS. 1 and 2, each of the jaw members 32 and 34 is generally rectangular in top, side and bottom profiles in this example; however, this is not strictly required and the jaw members may have other shapes in other embodiments. As seen in FIG. 1, the first jaw member 32 includes a planar top 48 that is rectangular in top profile in this example. The planar top 48 of the first jaw member includes a first sub-portion 49 and a second sub-portion 51, with each of the sub-portions is rectangular in top profile in this example. A central slot 54 extends through the planar top of the first jaw member 32 and between the first sub-portion 49 and second sub-portion 51 of the planar top of the first jaw member.

The first jaw member includes spaced-apart outer side walls 50 and 52 between which the planar top 48 thereof extends. The central slot 54 extends between the side walls of the first jaw member 32. The side walls 50 and 52 of the first jaw member are rectangular in side profile in this example. The outer side wall 50 of the first jaw member 32 couples to and extends downwards from the first sub-portion 49 of the planar top 48 of the first jaw member from the perspective of FIG. 1. The outer side wall 52 of the first jaw member couples to and extends downwards from the first sub-portion 51 of the planar top of the first jaw member from the perspective of FIG. 1.

Figure 6:
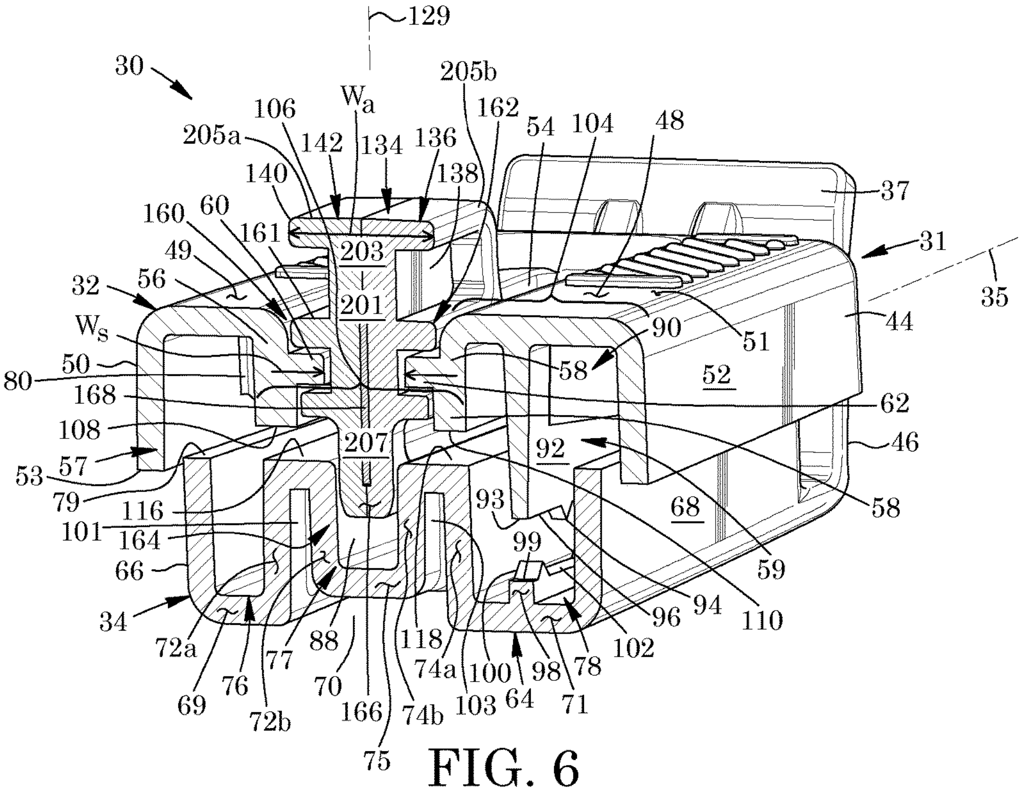
FIG. 6 is a sectional lateral view taken along lines 6-6 of the assembly of FIG. 1, with the jaw members shown in the closed, clamped position.

As seen in FIG. 6, the first jaw member 32 includes a pair of spaced-apart inner side walls 56 and 58 adjacent slot 54 and which face each other. The inner side wall 56 of the first jaw member couples to and extends downwards from first sub-portion 49 of the top 48 of the first jaw member from the perspective of FIG. 6 in this example. The inner side wall 58 of the first jaw member 32 couples to and extends downwards from first sub-portion 51 of the top of the first jaw member from the perspective of FIG. 6 in this example.

First sub-portion 49 of top 48, outer side wall 50 and inner side wall 56 of the first jaw member 32 form a first channel 57 of the first jaw member. Second sub-portion 51 of top 48, outer side wall 52 and inner side wall 58 of the first jaw member form a second channel 59 of the first jaw member. The channels are u-shaped in this example and face downwards from the perspective of FIG. 6.

Figure 4:
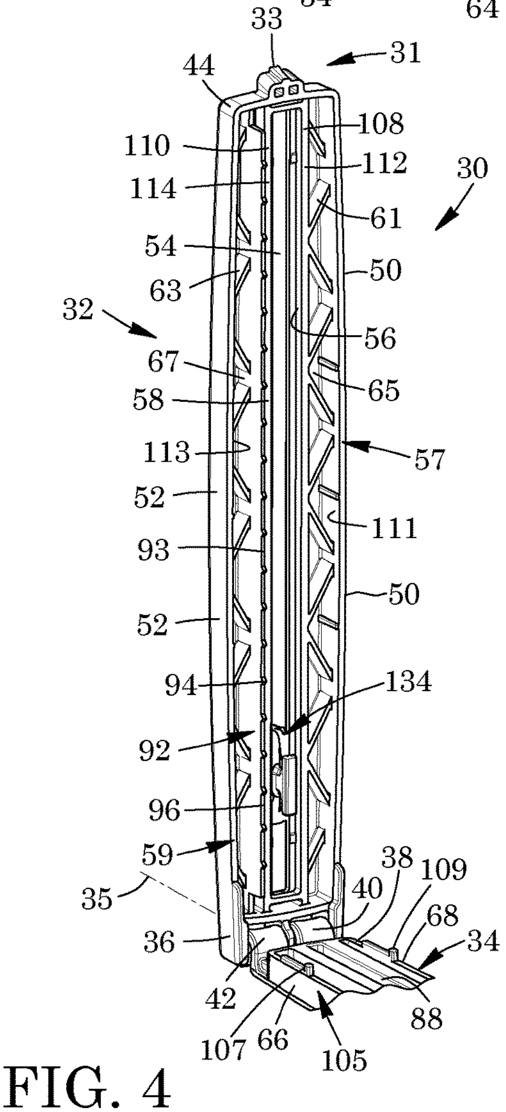
FIG. 4 is a bottom, right side perspective view of the first jaw member of the assembly of FIG. 1 shown in an unclamped position, together with a top, right side perspective view of the second jaw member of the assembly of FIG. 1, the second jaw member being shown in fragment.

The outer side walls 50 and 52 extend downwards from the sub-portions 49 and 51 of the top 48 of the first jaw member 32 to a greater extent than the inner side walls 56 and 58 in this example from the perspective of FIG. 6. As seen in FIG. 4, the first jaw member includes a plurality of strengthening members, in this example cross-braces 61 extending between the outer side wall 50 thereof and inner side wall thereof 56, and cross-braces 63 extending between the outer side wall 52 thereof and inner side wall 58 thereof.

Each of the cross-braces is angled relative to the longitudinal axis 35 of the assembly 30 in this example.

Channel 57 of the first jaw member 32 comprises a plurality of interconnected chambers 65 formed by first sub-portion 49 of top 48, outer side wall 50 and inner side wall 56 seen in FIG. 6, as well as braces 61 seen in FIG. 4. Channel 59 of the first jaw member 32 comprises a plurality of interconnected chambers 67 formed by second sub-portion 51 of top 48, outer side wall 52 and inner side wall 58 seen in FIG. 6, as well as braces 63 seen in FIG. 4. The chambers 65 and 67 are triangular and/or isosceles trapezoids in bottom and top profile in this example.

Referring back to FIG. 6, the first jaw member 32 includes a pair of spaced-apart elongate tracks, in this example tongues 60 and 62 coupled to and inwardly-extending from inner side walls 56 and 58 towards each other. The tongues are rectangular prisms in shape in this example. The tongues 60 and 62 are spaced downwards from the top 48 of the first jaw member relative to FIG. 6. The side walls 50, 52, 56, and 58, slot 54, sub-portions 49 and 51 of top 48 and tongues 60 and 62 of the first jaw member 32 extend parallel with longitudinal axis 35 of the assembly 30 in this example and extend between proximal end 36 and distal end 44 of the first jaw member seen in FIG. 1.

Referring to FIG. 2, the second jaw member 34 includes a planar bottom 64 that is rectangular in bottom profile in this example. As seen in FIG. 6, the planar bottom of the second jaw member comprises a pair of space-apart sub-portions 69 and 71, with each of the sub-portions is rectangular in bottom profile in this example. A central recess 70 extends between the sub-portions of the planar bottom 64 of the second jaw member 34; however this is not strictly required. The central recess of the second jaw member extends upwards from the bottom 64 of the second jaw member in this example and from the perspective of FIG. 6. The central recess 70 of the second jaw member 34 is generally rectangular in bottom profile and lateral section in this example.

The second jaw member includes spaced-apart outer side walls 66 and 68 between which the planar bottom 64 thereof extends. The side walls of the second jaw member are rectangular in side profile this example. The central recess 70 of the second jaw member 34 extends between the side walls 66 and 68 of the second jaw member from the perspective of FIG. 7. The outer side wall 66 of the second jaw member couples to and extends upwards from first sub-portion 69 of the planar bottom 64 of the second jaw member from the perspective of FIG. 6 in this example. The outer side wall 68 of the second jaw member 34 couples to and extends upwards from second sub-portion 71 of the planar bottom of the second jaw member from the perspective of FIG. 6 in this example.

As seen in FIG. 6, the second jaw member 34 includes a pair of spaced-apart inner side walls 72*a*, 72*b* and 74*a*, 74*b* in this example. Inner side walls 72*a* and 72*b* and inner side walls 74*a* and 74*b* downwardly facing channels 101 and 103 in this example. Inner side wall 72*a* of the second jaw member 34 couples to and extends upwards from the first sub-portion 69 of the planar bottom 64 of the second jaw member from the perspective of FIG. 6 in this example. Inner side wall 72*b* of the second jaw member couples to and extends upwards from bottom wall 75 of the second jaw member. Inner side wall 74*a* of the second jaw member 34 couples to inner side wall 74*b* and also couples to and extends upwards from the second sub-portion 71 of the planar bottom of the second jaw member from the perspective of FIG. 6 in this example. Inner side wall 74*b* of the second jaw member couples to inner side wall 74*a* and also couples to and extends upwards from bottom wall 75 of the second jaw member.

Figure 7:
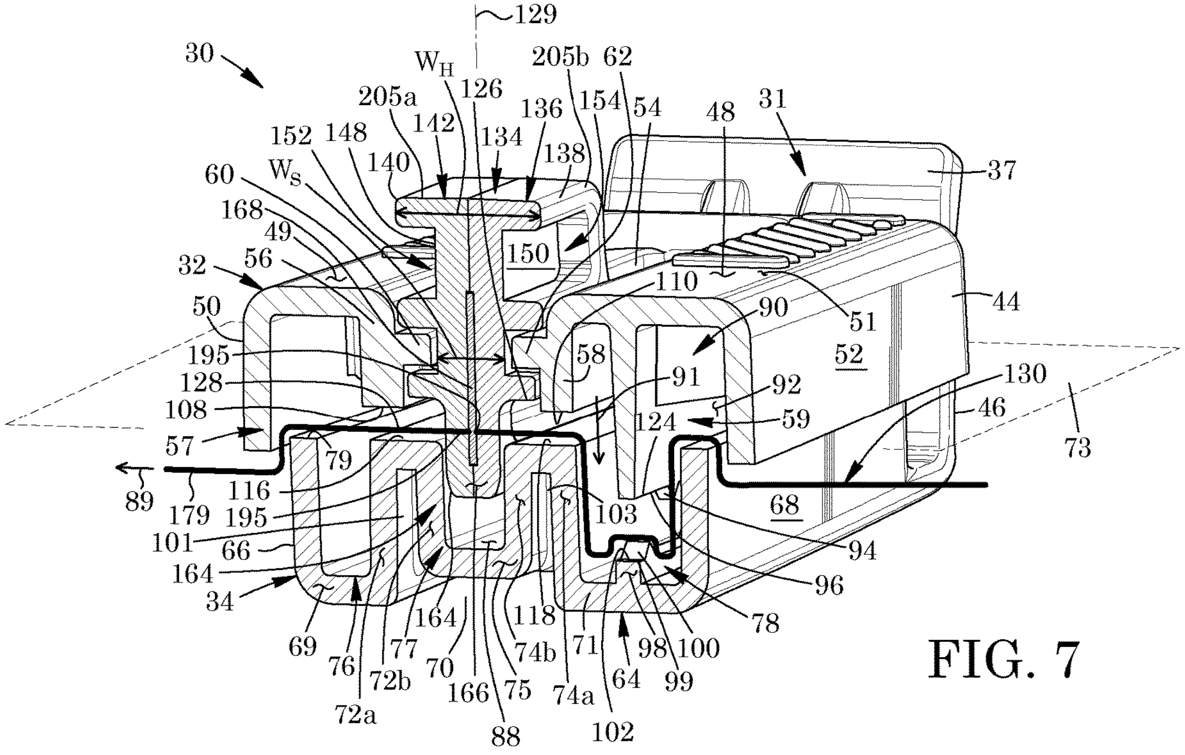
FIG. 7 is a sectional lateral view of the assembly similar to FIG. 6 with a cross-sectional view of a bag shown clamped between the jaw members of the assembly, with the bag being shown in fragment.

The outer side walls 66 and 68 of the second jaw member extend upwards from the planar bottom 64 of the second jaw member to a substantially similar extent as the inner side walls 72*a*, 72*b* and 74*a*, 74*b* in this example. As seen in FIG. 7, the side walls 66, 68, 72*a*, 72*b* and 74*a*, 74*b* of the second jaw member 34 align together within a plane 73 spanning the top 79 of the second jaw member in this example.

First sub-portion 69 of planar bottom 64, outer side wall 66 and inner side wall 72*a* of the second jaw member form a first channel 76 of the second jaw member. Second sub-portion 71 of the planar bottom, outer side wall 68 and inner side wall 74 form a second channel 78 of the second jaw member 34. The second channel of the second jaw member may be referred to as a clamping channel.

Figure 5:
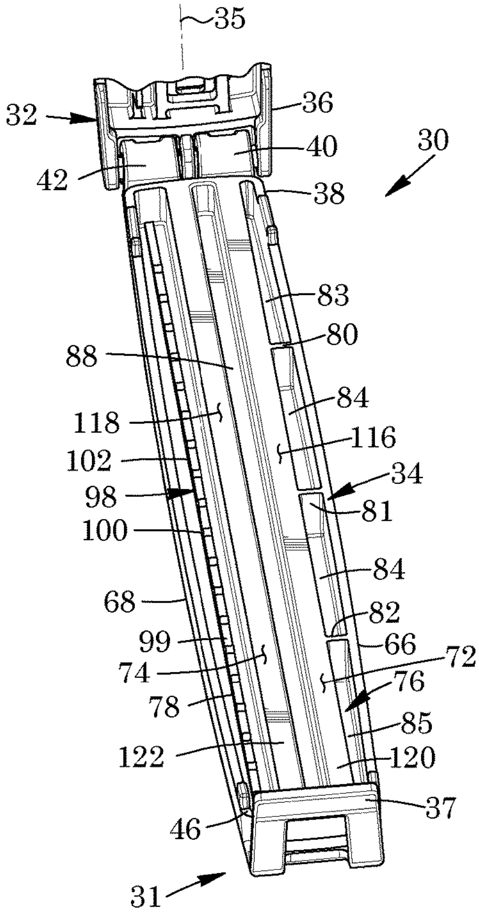
FIG. 5 is a top perspective view of the second jaw member of the assembly of FIG. 1, together with a bottom perspective view of the first jaw member of the assembly of FIG. 1 shown in an unclamped position and shown in fragment.

As seen in FIG. 5, the second jaw member 34 includes a plurality of strengthening members, in this example axially spaced-apart cross-braces 80, 81 and 82 extending between the outer side wall 66 and inner side wall 72*a*. Channel 76 of the second jaw member 34 comprises a plurality of interconnected sub-portions or chambers 83, 84, 85 and 86 in this example formed by first sub-portion 69 of planar bottom 64, outer side wall 66 and inner side wall 72*a* seen in FIG. 6, as well as cross-braces 80, 81 and 82 seen in FIG. 5.

Referring back to FIG. 6, the second jaw member 34 has a central recessed region or elongate groove 88 extending between inner side walls 72*b* and 74*b* thereof. The elongate groove is positioned between outer side walls 66 and 68 of the second jaw member. The elongate groove 88 of the second jaw member 34 aligns with and is positioned above recess 70 of the second jaw member in this example. The elongate groove of the second jaw member is rectangular in top profile and lateral section in this example.

The second jaw member 34 includes a bottom wall 75 extending between inner side walls 72*b* and 74*b* of the second jaw member 34. The bottom wall of the second jaw member couples to and is integrally formed with the inner side walls of the second jaw member in this example. The bottom wall of the second jaw member 34 is rectangular in bottom profile in this example. The bottom wall 75 of the second jaw member is in fluid communication with and defines in part recess 70 of the second jaw member. The bottom wall of the second jaw member 34 is in fluid communication with and defines in part groove 88 of the second jaw member.

As seen in FIG. 6, inner side walls 72*b* and 74*b* and bottom wall 75 of the second jaw member 34 form a third channel or cutting channel 77 of the second jaw member. Channels 76, 77 and 78 are u-shaped in this example and face upwards from the perspective of FIG. 6.

Side walls 66, 68, 72*a*, 72*b*, 74*a* and 74*b*, first sub-portion 69 and second sub-portion 71 of bottom 64, recess 70, elongate groove 88, bottom wall 75, and channels 76, 77 and 78 extend parallel with longitudinal axis 35 of the assembly 30 in this example and extend between proximal end 38 and distal end 46 of the second jaw member seen in FIG. 1. Cutting channel 77 is laterally spaced-apart from and interposed between channels 76 and 78.

Still referring to FIG. 6, the jaw members 32 and 34 include a clamping mechanism 90. The clamping mechanism includes a first clamping member 92 positioned within channel 59 between outer side wall 52 and inner side wall 58 of the first jaw member 32. The first clamping member couples to, is integrally formed with and extends downwards from second sub-portion 51 of the planar top 48 of the first jaw member from the perspective of FIG. 6 in this example. The first clamping member 92 extends downwards from the planar top of the first jaw member to a greater extent and past the side walls 50, 52, 56 and 58 of the first jaw member in this example, such that the distal end 96 thereof is positioned below the side walls of the first jaw member from the perspective of FIG. 6 in this example. The first clamping member tapers in a direction 91 extending from second sub-portion 51 of the top 48 of the first jaw member 32 towards the second sub-portion 71 of bottom 64 of the second jaw member 34 when the jaw members are clamped together and from the perspective of FIG. 7 in this example. As seen in FIG. 4, the first clamping member 92 has a clamping surface 93 comprising a plurality of axially spaced-apart protrusions, serrations or teeth 94 extending outwards from the distal end 96 thereof. Cross-braces 63 extend between the outer side wall 52 of jaw member 32 and first clamping member 92 in this example.

Referring back to FIG. 6, the clamping mechanism 90 includes a second clamping member 98 positioned within channel 78 between outer side wall 68 and inner side wall 74 of the second jaw member 34. The second clamping member couples to, is integrally formed with and extends upwards from the second sub-portion 71 of the planar bottom 64 of the second jaw member from the perspective of FIG. 6 in this example. As seen in FIG. 5, the second clamping member 98 has a clamping surface 99 comprising a plurality of spaced-apart protrusions, serrations or teeth 100 extending outwards from the distal end 102 thereof.

As seen in FIG. 7, teeth 94 of the first clamping member 92 are interposed between and axially spaced from the teeth of the second clamping member 98 respectively. Clamping surfaces 93 and 99 are positioned within and extend parallel to channel 78 and longitudinal axis 35 of the assembly 30. The clamping surfaces are laterally spaced-apart from cutting channel 77. The jaw members 32 and 34 thus have a first clamping region 104 comprising the clamping mechanism 90 that is laterally spaced-apart from axis 35. The first clamping region comprises the pair of clamping surfaces 93 and 99.

The jaw members 32 and 34 in this example have a second clamping region 106 aligned with longitudinal axis 35 of the assembly 30. The second clamping region is laterally spaced-apart from the first clamping region 104 in this example. As seen in FIG. 4, the first jaw member 32 has spaced-apart clamping surfaces 108 and 110 that extend along distal or interior ends 112 and 114 of inner side walls 56 and 58 thereof. The clamping surfaces 108 and 110 are planar and rectangular in this example. As seen in FIG. 5, the second jaw member 34 has spaced-apart clamping surfaces 116 and 118 that extend along distal or interior ends 120 and 122 of inner side walls **72*a*, 72*b*, 74*a* and 74*b* thereof. The clamping surfaces 116 and 118 are planar and rectangular in this example. Clamping surfaces 108, 110, 116 and 118 are located within the second clamping region 106 seen in FIG. 6 and may be considered part of the clamping mechanism of the jaw members 32 and 34. Still referring to FIG. 6, the jaw members in this embodiment thus form three pairs of clamping surfaces: one pair of clamping surfaces 93 and 99 is positioned within the clamping region 104 and two of the pairs of clamping surfaces 108 and 116 and 110 and 118 are positioned within the clamping region 106**.

Referring to FIG. 7, laterally spaced-apart bag material or portions 124, 126 and 128 of bag 130 are selectively seal together at least in part via channel 78, and clamping surfaces 93 and 99, 108 and 116, and 110 and 118. The portions of the bag are adjacent to the upper portion or end 132 of the bag seen in FIG. 15. The end of the bag may be an open or closed end.

Figure 15:
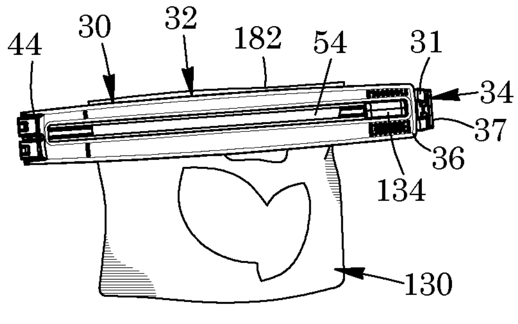
FIG. 15 is a front perspective view of the bag and assembly of FIG. 14 with the assembly shown in a re-adjusted position spaced below the cut or open-mouthed end of the bag.

As seen in FIG. 1, the assembly 30 includes a cutting mechanism, in this example a bag cutter 134 via which bag 130 seen in FIG. 15 is selectively cut. As seen in FIG. 9, the bag cutter includes a longitudinal axis 129. The bag cutter 134 includes a housing 136 comprising two sub-portions 138 and 140 positioned on either side of the longitudinal axis 129 thereof. The sub-portions of the housing in this example are generally mirror images of each other, with each comprising halves of the housing. The sub-portions 138 and 140 of the housing 136 selectively couple together in this example. The sub-portions of the housing selectively couple together in this example via a snap-fit connection comprising at least one protrusion or knob 143 seen in FIG. 8 coupled to and extending outwards from sub-portion 138 of housing 136. The knob selectively press-fits within a corresponding recess (not shown) extending within sub-portion 140 of the housing seen in FIG. 9. However this is not strictly required and the sub-portions 138 and 140 of the housing 136 may selectively couple together in other manners in other embodiments.

Figure 11:
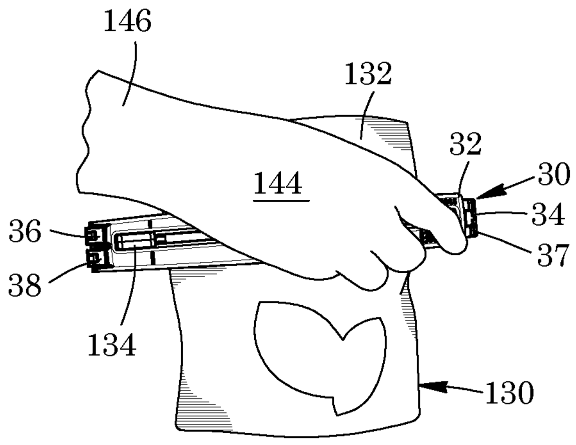
FIG. 11 is a front perspective view of the bag of FIG. 10, with the assembly of FIG. 1, including the jaw members thereof in the unclamped position, in the process of extending about a closed upper portion of the bag.

Still referring to FIG. 9, the housing 136 of the bag cutter 134 includes a first, upper or handle end portion 142 shaped to be gripped by the hand 144 of a person 146 seen in FIG. 11. As seen in FIG. 7, the handle end portion of the bag cutter 134 has a cross-sectional width $W_H$ that is larger than the cross-sectional width $W_S$ of the central slot 54. The handle end portion 142 of the bag cutter 134 in this example includes a pair of opposed recessed portions 148 and 150 positioned along opposed sides 152 and 154 thereof. The recessed portions are shaped to receive the upper parts of the thumb 156 and index finger 158 of person 146 seen in FIG. 12 and are rectangular in this example. As seen in FIG. 9, the handle end portion 142 of the bag cutter 134 is generally rectangular in side profile in this example, with a pair of spaced-apart end surfaces 131 and 133 which are outwardly concave and a top surface 135 which is planar in this example. However, this is not strictly required and the handle end portion of the bag cutter may have other shapes in other embodiments.

As seen in FIG. 6, the bag cutter 134 reciprocatingly couples to the first jaw member 32. In this example the bag cutter reciprocatingly couples to the first jaw member via one or more elongate tongues and grooves: in this case the handle end portion 142 of the bag cutter 134 includes a pair of spaced-apart, elongate channels 160 and 162 shaped to slidably receive corresponding elongate tongues 60 and 62 of the first jaw member. The channels of the bag cutter 134 are c-shaped in longitudinal section and face opposite to each other. Channels 160 and 162 are outwardly facing towards tongues 60 and 62 and channels 57 and 59 of the first jaw member 32, respectively. The bag cutter 134 is thus reciprocatingly mounted to the first jaw member in this example; however this manner of coupling with the first jaw member is not strictly required and the bag cutter may reciprocatingly couple to the first jaw member is other manners in other embodiments.

As seen in FIG. 9, each channel 160 of the bag cutter 134 includes a first or upper channel wall 161 which may be considered part of handle end portion 142 of the bag cutter 134. The upper channel wall has spaced-apart ends 167 and 169. Each channel 160 of the bag cutter 134 includes a second or lower channel wall 171 that is inwardly spaced from ends 167 and 169 thereof in this example. The lower channel wall has spaced-apart ends 177 and 179 and a recessed portion 209 between the ends thereof. The recessed portion of the lower channel wall 171 is rectangular in this example. Each channel 160 includes a third or side channel wall 181 extending between upper channel wall 161 thereof and lower channel wall 171 thereof.

Still referring to FIG. 9, the bag cutter 134 includes a second, lower or tongue end portion 164 coupled to and integrally formed with the handle end portion 142 thereof. As seen in FIG. 6, the bag cutter slidably couples to the second jaw member 34 via one or more elongate tongues and grooves: in this example the tongue end portion of the bag cutter comprises an elongate tongue 166 shaped to be selectively received within and slidable along elongate groove 88 of the cutting channel 77 of the second jaw member. The bag cutter 134 thus slidably couples to the second jaw member 34. The bag cutter extends into the second jaw member 34 between the pair of clamping surfaces 108 and 116 and the pair of clamping surfaces 110 and 118 of the jaw members in this example. The pair of clamping surfaces 93 and 99 is laterally spaced-apart from the bag cutter 134.

As seen in FIG. 9, the elongate tongue 166 of the bag cutter 134 has a pair of spaced-apart ends 197 and 199 that are inwardly spaced-apart from ends 167 and 169 of the upper channel wall 161 in this example. The bag cutter includes a pair of recessed portions 183 and 185 between the elongate tongue 166 and side channel wall 181. The recessed portions extend inwards relative to ends 167 and 169 of channels 160 and 162. As seen in FIG. 6, upper channel walls 161 and lower channel walls 171 of channels 160 and 162 couple to, integrally formed with and extend laterally outwards from tongue 166 in this example. Still referring to FIG. 6, the bag cutter 134 may be said to comprise an elongate, axially-extending planar base 201 with: an upper portion 203 thereof about which extends a first peripheral, laterally-extending flange 205*a* extending in a first or left direction relative to FIG. 6 and a second peripheral, laterally-extending flange 205*b* extending in a second or right direction relative to FIG. 6; and the planar base further including a lower portion 207 comprising elongate tongue 166, and a pair of lower channels 171 spaced above the elongate tongue and coupled to and extending laterally outwards therefrom in opposite directions.

Figure 8:
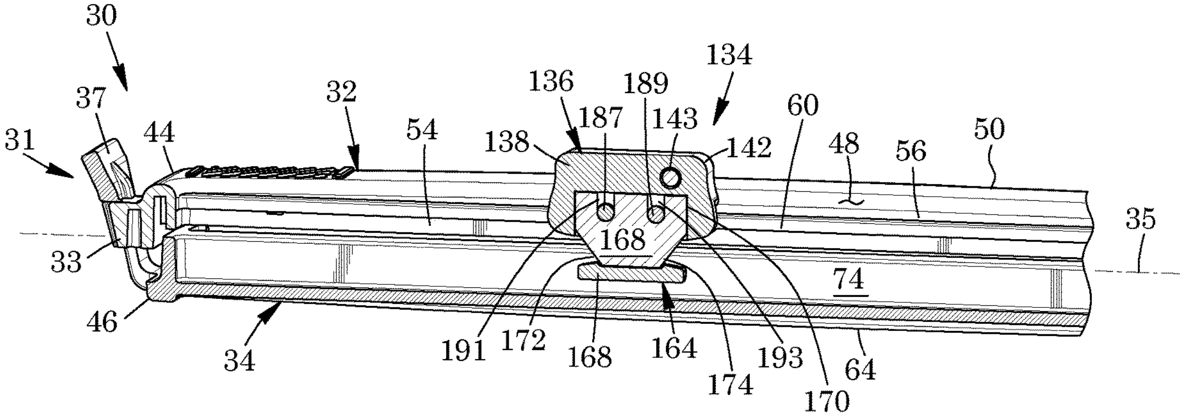
FIG. 8 is a sectional longitudinal view taken along lines 8-8 of the assembly of FIG. 1, with the jaw members and a locking mechanism of the assembly shown in fragment.
Figure 9:
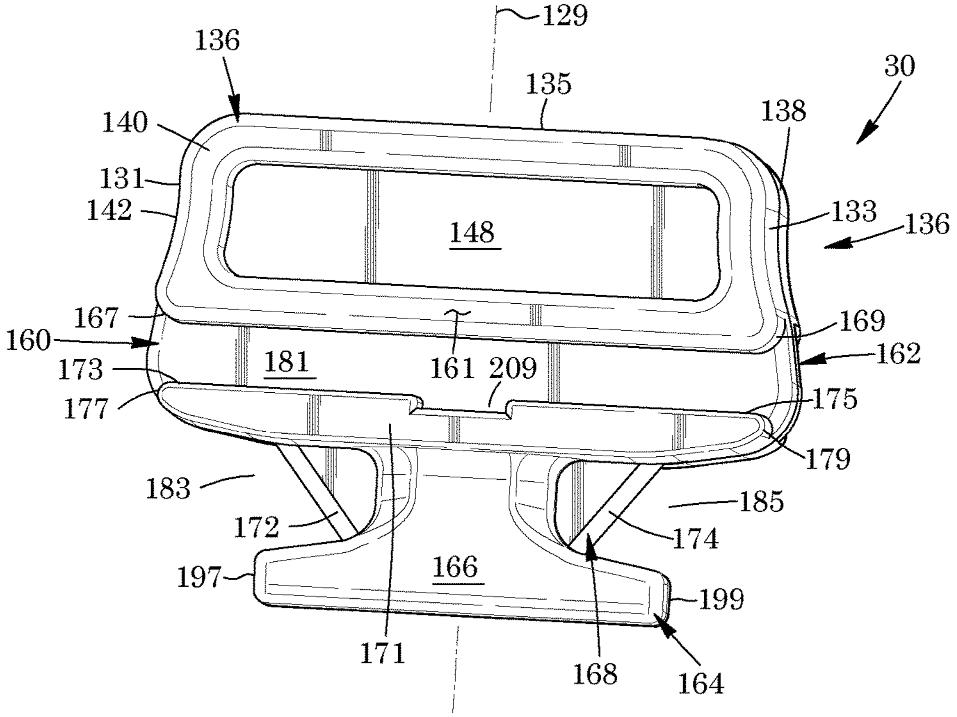
FIG. 9 is a left side perspective view of the bag cutter of FIG. 1, with the rest of the assembly not being shown.
Figure 10:
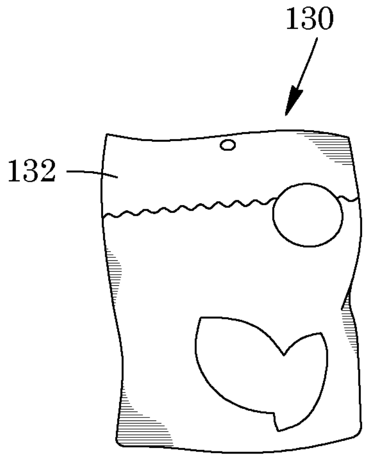
FIG. 10 is a front perspective view of the bag of FIG. 6.

Referring to FIG. 8, the bag cutter includes at least one reciprocating blade 168. The blade is shaped to fit between sub-portions 138 and 140 of the housing 136 seen in FIG. 9 within inner recesses 170 thereof seen in FIG. 8 in this example. Still referring to FIG. 8, the blade 168 further couples to the housing in this example via protrusions 187 and 189 of the housing that extend within corresponding spaced-apart recessed portions 191 and 193 of the blade in this example. The blade is positioned between the handle end portion 142 of the bag cutter 134 and the tongue end portion 164 of the bag cutter 134.

Still referring to FIG. 8, the blade 168 in this example includes at least one and in this example a pair of spaced-apart cutting edges 172 and 174. The cutting edges face opposite directions and are triangular in this example. As seen in FIG. 9, cutting edges 172 and 174 of the blade 168 are positioned within the recessed portions 183 and 185 of the bag cutter 134. As seen in FIG. 9, the cutting edges of the blade are laterally inwardly positioned relative to ends 197 and 197 of the tongue end portion 164 of the bag cutter and relative to ends 167 and 169 of the channels 160. The end portions 142 and 164 of the bag cutter are shaped to inhibit access to the blade and the cutting edges of the blades, so as to inhibit the thumb 156 or finger 158 of person 146 or a child from reaching the blades for example and inadvertently being cut therefrom. As seen in FIG. 6, the blade 168 of the bag cutter 134 extends into the cutting channel 77 of the second jaw member 34 adjacent the clamping region 106.

Figure 12:
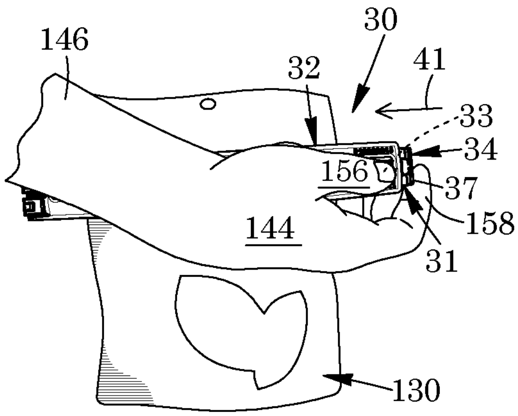
FIG. 12 is a front perspective view of the bag and assembly of FIG. 11, with the distal ends of the jaw members shown in the process of being pressed together to couple the assembly to the bag and seal the closed upper portion of the bag.

In operation and referring to FIG. 11, the bag cutter 134 is positioned adjacent to one of the pairs of ends of the jaw members 32 and 34, in this example adjacent to proximal ends 36 and 38 of the jaw members. The assembly 30 next extends about bag 130 to be opened adjacent upper portion or end 132 of the bag to be opened. As seen in FIG. 12, the jaw members 32 and 34 are next selectively coupled together at the distal ends 44 and 46 thereof by actuating the locking mechanism 31: catch 37 and protrusion 33 are biased together via hand 144 and couple together thereby.

With the jaw members so coupled together and referring to FIG. 7, clamping members 92 and 98 of the first clamping region 104 of the assembly 30 tightly clamp the bag 130 together. The clamping members so positioned create a seal for the contents of the bag. The clamping members 92 and 98 so positioned further hold portion 124 of the bag therebetween and inhibit said portion of the bag from moving so that the bag cutter 134 can effectively cut through the bag 130.

The cutting edges 172 and 174 of the blade 168 seen in FIG. 9 align with a portion 195 of the bag 130 to be cut seen in FIG. 7 within cutting channel 77. The handle end portion 142 of the bag cutter 134 seen in FIG. 1 is gripped by hand 144 seen in FIG. 13 and moved from one pair of ends of the jaw members to the other pair of ends: in this example in direction 176 seen in FIG. 13 towards distal ends 44 and 46 of the jaw members 32 and 34. The portion 195 of the bag seen in FIG. 7 is cut through thereby. In this mode the bag 130 is clamped via at least clamping surfaces 93 and 99, as well as clamping surfaces 110 and 118 seen in FIG. 7 along two laterally spaced-apart portions 124 and 126 of bag 130.

Figure 13:
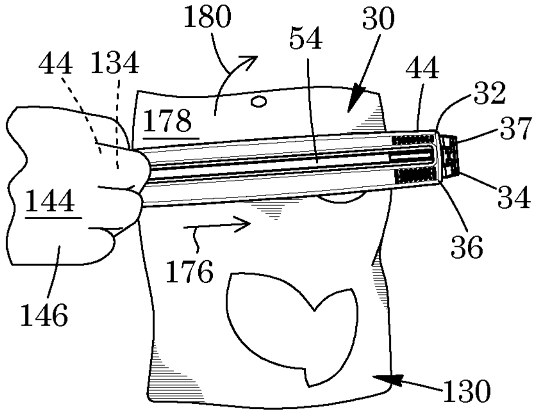
FIG. 13 is a front perspective view of the bag and assembly of FIG. 12, with the jaw members of the assembly shown in the clamped position and coupled to the closed upper portion of the bag, and with the bag cutter of the assembly being shown in the process of moving from proximal ends of the jaw members towards distal ends of the jaw members to selectively cut and thereafter remove excess portions of the bag.
Figure 14:
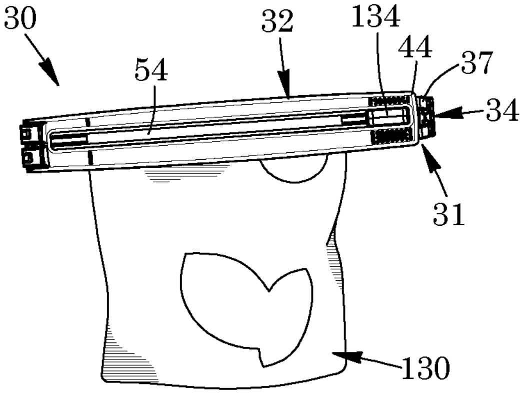
FIG. 14 is a front perspective view of the bag and assembly of FIG. 13 with the bag cutter shown adjacent the distal ends of the jaw members and with the excess portions of the bag having been cut and removed therefrom.

Referring to FIG. 13, the newly severed bag material or severed portion 178 of the bag 130 above the assembly 30, from the perspective of FIG. 13, is next removed as shown by arrow 180. As seen in FIG. 7, the jaw members 32 and 34 come together and lightly clamp the bag between the bottom 53 of outer side wall 50 of jaw member 32, top 79 of outer side wall 66 and cross-braces 80. This region 87 is shaped to enable severed portion 178 of the bag 130 to be readily removed without having to open the clamping members 32 and 34 and thus unseal the bag. The user may simply give a light tug or pull on the material, as shown by arrow of 89, and the severed portion 178 easily pulls out of the region 87.

The assembly 30 is optionally next unclamped from the bag by the following steps shown in FIGS. 11 and 12 in reverse. The assembly so unclamped is spaced downwards from the cut edge 182 of the bag 130 from the perspective of FIG. 15 and then re-clamped to the bag once more following the steps shown and describes in FIGS. 11 and 12. This final step may ensure that clamping surface 108 and 116 seen in FIG. 7 also engage with portion 124 of the bag 130, functioning to further clamp the bag thereby and further promote sealing of the bag. Clamping surfaces 93 and 99 and 110 and 118 further engage with portions 128 and 126 of the bag. This functions to cause jaw members 32 and 34 as herein described to additionally clamp the bag 130 along three laterally spaced-apart portions 124, 126 and 128 of the bag and inhibit contents and air from within the bag from escaping.

Figure 16:
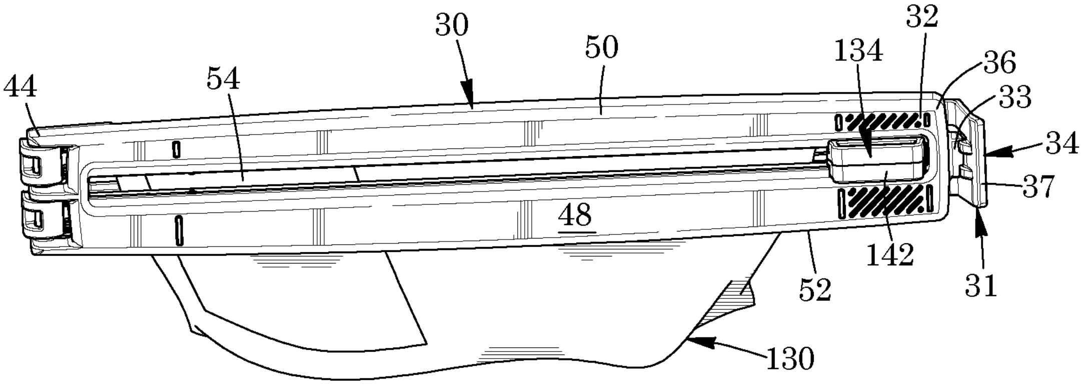
FIG. 16 is a front perspective view of the assembly of FIG. 1 together with another bag to which the jaw members of the assembly are clamped, the bag comprising only a lower portion containing consumable goods therewithin, with the rest of the bag comprising excess material that has been removed by the assembly.

The assembly 30 may thus be used in this manner to selectively remove one or more items from the bag 130 and seal the bag thereafter, while also removing excess portions of the bag and reducing the amount of excess space/air within the bag, as seen in FIG. 16.

Figure 17:
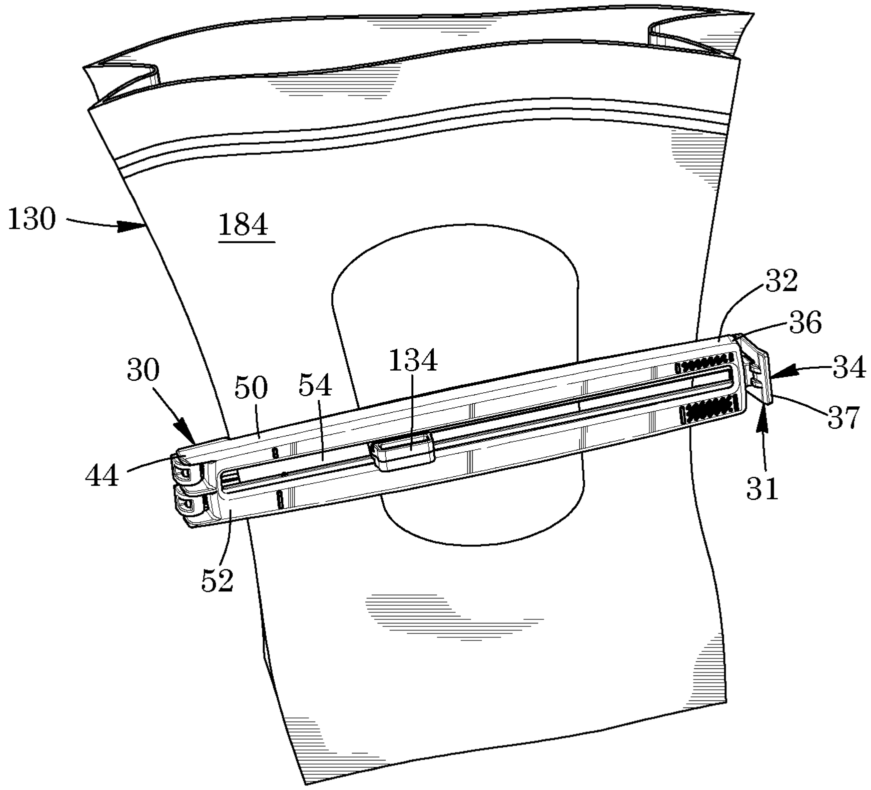
FIG. 17 is a front perspective view of the assembly of FIG. 1 together with a further bag to which the jaw members of the assembly are clamped between the top and bottom of the bag, with the assembly shown sealing the bag without deploying the bag cutter to remove any excess portions therefrom.

In addition or alternatively and referring to FIG. 17, the assembly 30 as herein described may used to clamp and seal the bag 130 without actuating the bag cutter 134 and thus without removing upper portion 184 of the bag positioned above the assembly 30 from the perspective of FIG. 17.

Figure 18:
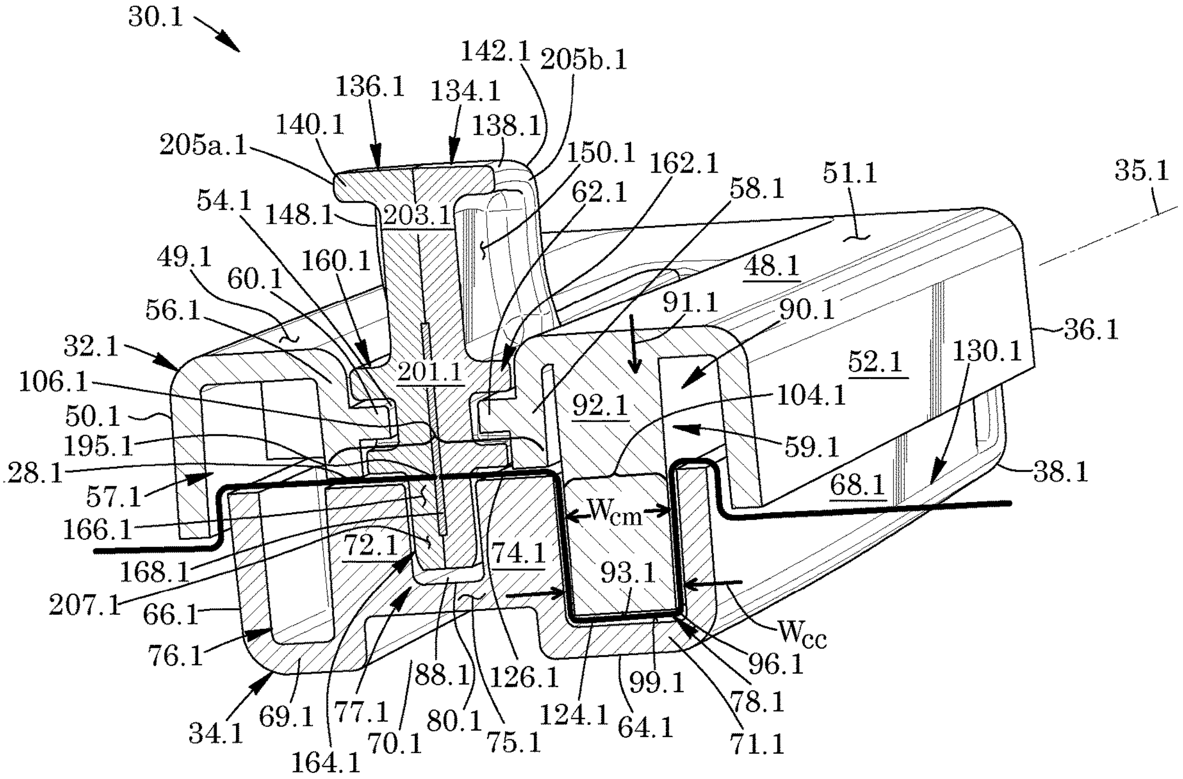
FIG. 18 is a sectional lateral view of a bag cutting and clamping assembly according to a second aspect, with a fragmented view of a bag shown clamped between the jaw members of the assembly.

FIG. 18 shows a bag cutting and clamping assembly 30.1 according to a second aspect. Like parts have like numbers and functions as the bag cutting and clamping assembly shown in FIGS. 1 to 17 with the addition of decimal extension "0.1". Assembly 30.1 is substantially the same as assembly 30 shown in FIGS. 1 to 17 with at least the following exceptions.

In this embodiment clamping mechanism 90.1 includes a first clamping member 92.1 shaped to be fully received and snugly fit within clamping channel 78.1. The clamping member has a width $W_{CM}$ generally equal to the width $W_{CC}$ of the clamping channel. The first clamping member 92.1 is an isosceles trapezoid in lateral cross-section in this example. The first clamping member 92.1 tapers in a direction 91.1 extending from the second sub-portion 51.1 of the top 48.1 of the first jaw member 32.1 towards second sub-portion 71.1 of bottom 64.1 of the second jaw member 34.1 when the jaw members are clamped together and from the perspective of FIG. 18 in this example.

The elongate jaw members are held together by a pressure fit between the jaw members 32.1 and 34.1 as the jaw members engage the bag material. This may eliminate the need for a distal end locking mechanism.

Inner side walls 72.1 and 74.1 of the second jaw member 34.1 are rectangular prisms in lateral cross-section in this example. The inner side walls of the second jaw member 34.1 are thicker than the outer side walls 66.1 and 68.1 of the second jaw member in this example.

Figure 19:
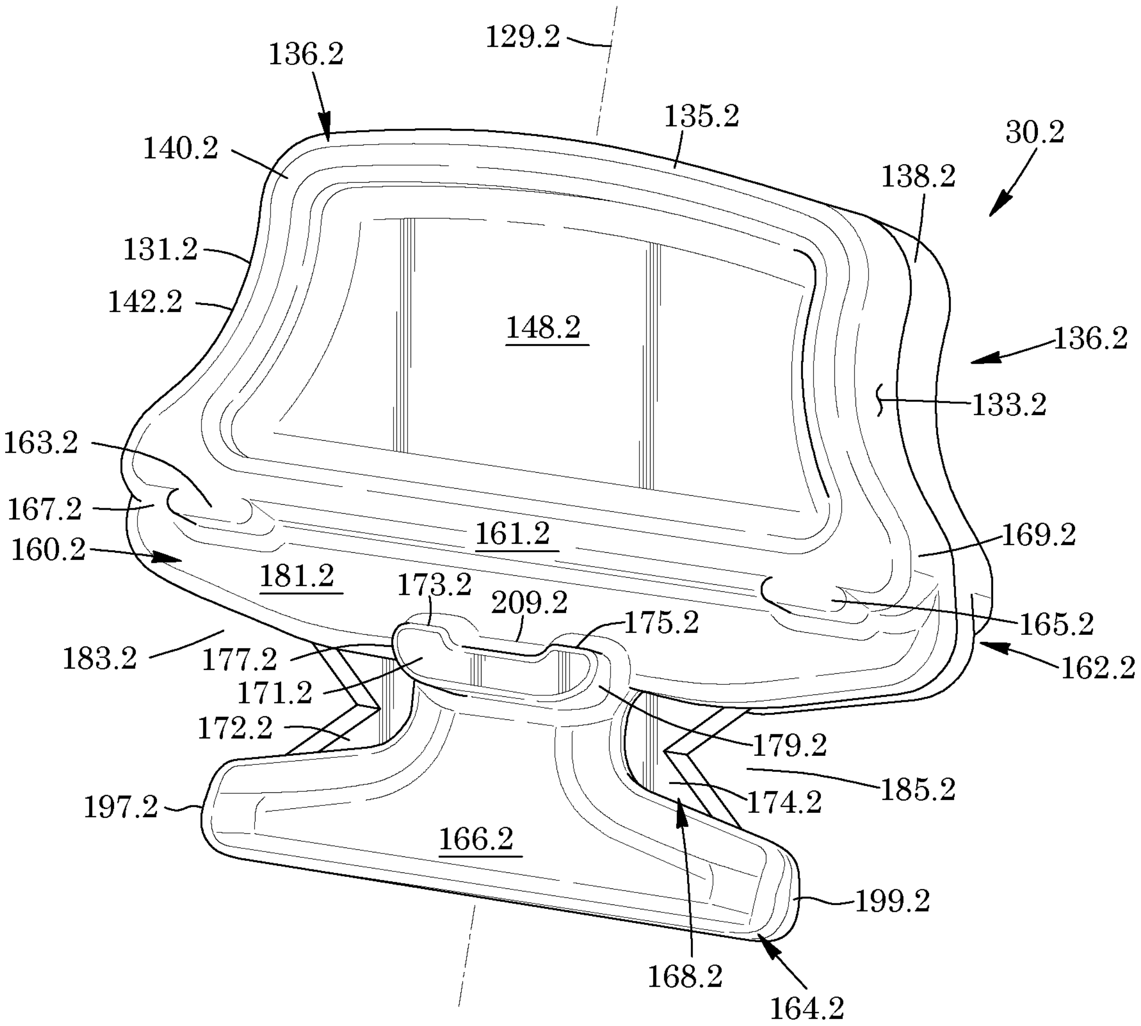
FIG. 19 is a left side perspective view of a bag cutter of a bag cutting and clamping assembly according to a third aspect, with the rest of the assembly not being shown.

FIG. 19 shows a bag cutter 134.2 for a bag cutting and clamping assembly 30.2 according to a third aspect. Like parts have like numbers and functions as the bag cutting and clamping assembly 30 shown in FIGS. 1 to 17 with the addition of decimal extension "0.2". Bag cutter 134.2 and assembly 30.2 are substantially the same as bag cutter 134 and assembly 30 shown in FIGS. 1 to 17 with at least the following exceptions.

As seen in FIG. 19, the handle end portion 142.2 of the bag cutter 134.2 is generally an isosceles trapezoid in side profile in this example, with a pair of spaced-apart end surfaces 131.2 and 133.2 which are outwardly concave and a top surface 135.2 which is outwardly convex in this example. The recessed portions 148.2 of the handle end portions 142.2 of the bag cutter are isosceles trapezoidal in shape in this example.

Each upper channel wall 161.2 of each channel 160.2 of the bag cutter includes a pair of spaced-apart, downwardly-extending protrusions 163 and 165 located adjacent to ends 167.2 and 169.2 of the channel thereof from the perspective of FIG. 19 and in this example. Ends 197.2 and 199.2 of the elongate tongue 166.2 of the bag cutter 134.2 align with protrusions 163 and 165 of the upper channel walls 161.2 of the bag cutter in this example.

Each channel 160.2 of the bag cutter 134.2 includes a second or lower channel wall 171.2 that is inwardly spaced from ends 167.2 and 169.2 thereof in this example. Each lower channel wall includes a pair of spaced-apart, upwardly-extending protrusions 173 and 175 located adjacent to ends 177.2 and 179.2 thereof from the perspective of FIG. 19 in this example. The recessed portion 209.2 of the lower channel wall 171.2 is positioned between protrusions 173 and 175.

The cutting edges 172.2 and 174.2 of the blade 168.2 are v-shaped in side profile in this example.

Figure 20:
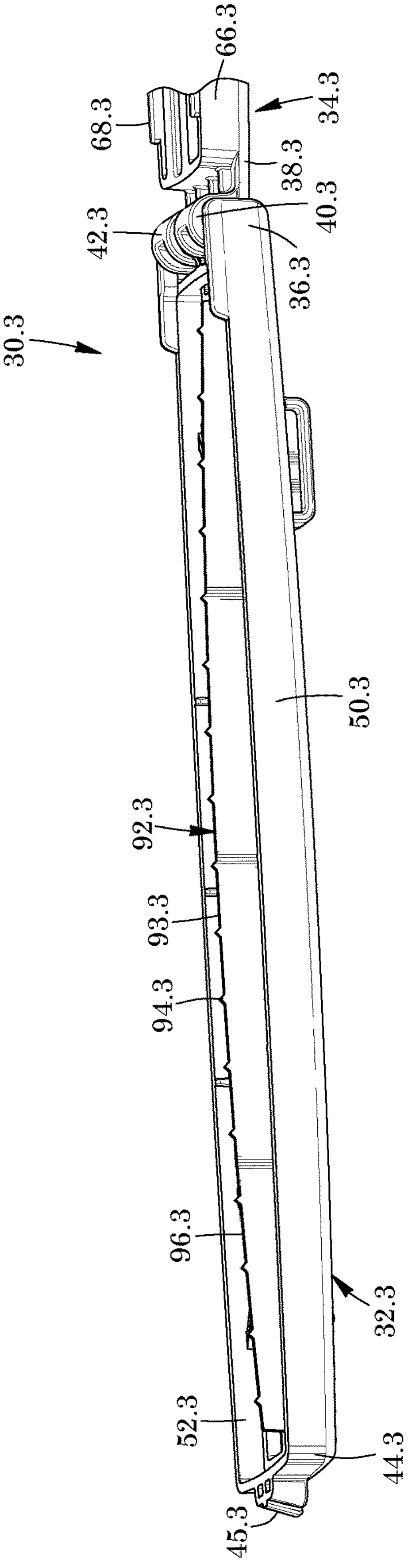
FIG. 20 is a right side, top perspective view a bag cutting and clamping assembly according to a fourth aspect, with the jaw members shown in a full open, unclamped position, and with the second jaw member shown in fragment.

FIG. 20 shows a bag cutting and clamping assembly 30.3 according to a fourth aspect. Like parts have like numbers and functions as the bag cutting and clamping assembly shown in FIGS. 1 to 17 with the addition of decimal extension "0.3". Assembly 30.3 is substantially the same as assembly 30 shown in FIGS. 1 to 17 with at least the following exception.

First clamping member 92.3 has an outer peripheral edge 211 that extends between ends 36.3 and 44.3 thereof. The outer peripheral edge of the first clamping member is in this example curved at least in part, in this case outwardly convex, with an apex 213 positioned between the ends of the first clamping member in this example. The first clamping member 92.3 so shaped may function to inhibit, or counter balance at least in part, the natural bowing out of the jaw members 32.3 and 34.3 that may otherwise occur when the jaw members are under a load by clamping a bag. However, this is curvature is not strictly required and the first clamping member may have an outer peripheral edge that is planar in other embodiments.

Figure 21:
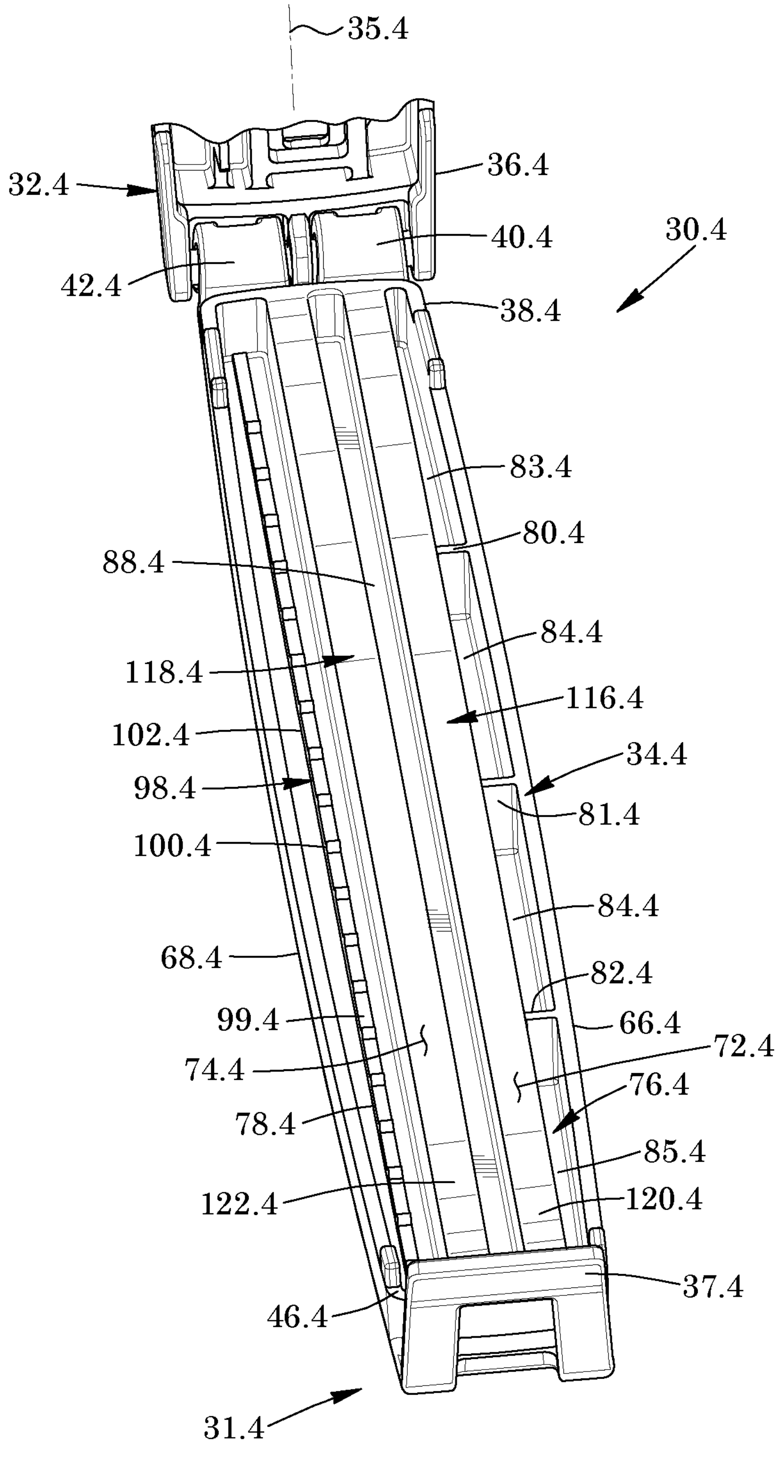
FIG. 21 is a top perspective view of a bag cutting and clamping assembly according to a fifth aspect, with the jaw members shown in a full open, unclamped position and with the first jaw member shown in fragment.
Figure 22:
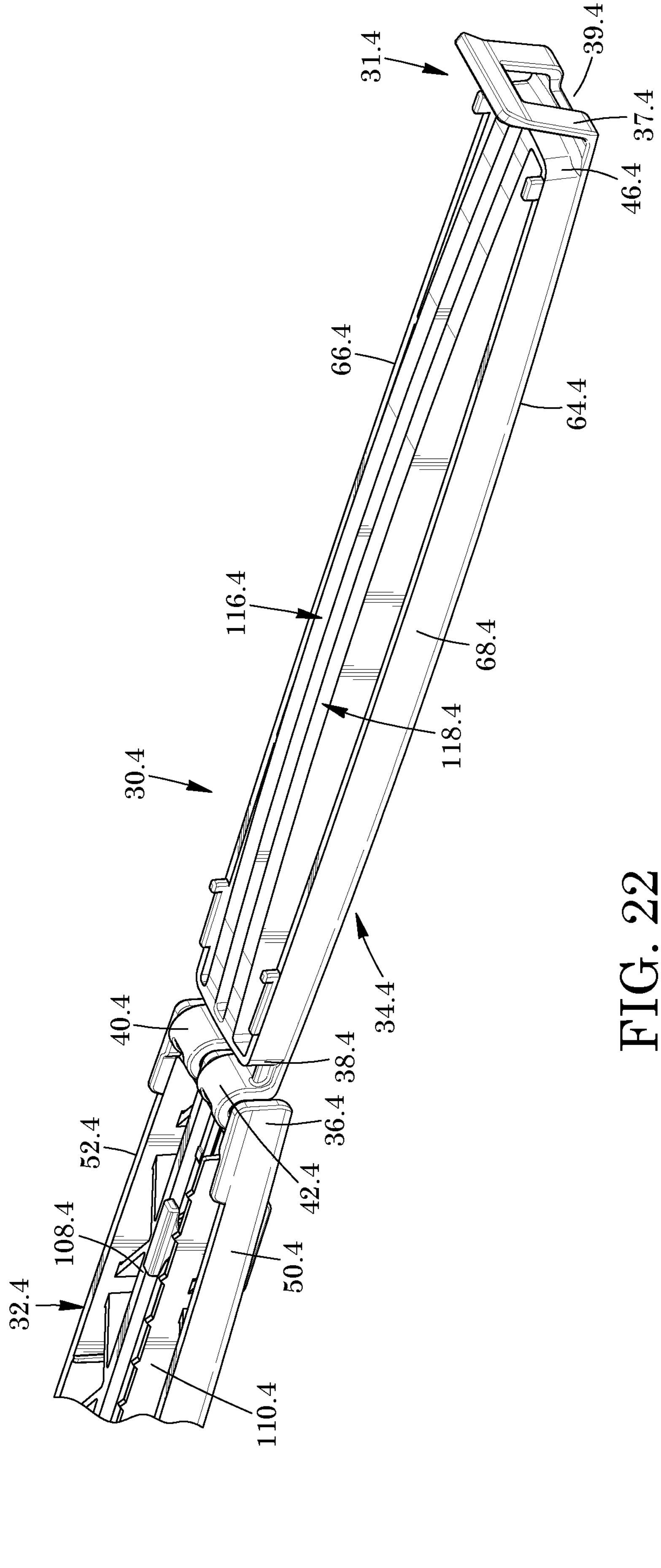
FIG. 22 is a right side, top perspective view thereof, with the first jaw member shown in fragment.

FIGS. 21 and 22 shows a bag cutting and clamping assembly 30.4 according to a fifth aspect. Like parts have like numbers and functions as the bag cutting and clamping assembly 30 shown in FIGS. 1 to 17 with the addition of decimal extension "0.4". Assembly is substantially the same as assembly 30 shown in FIGS. 1 to 17 with at least the following exception.

As seen in FIG. 22, at least one and in this example both clamping surfaces 116.4 and 118.4 of the second jaw member 34.4 are curved at least in part, in this case outwardly convex. The clamping surfaces 108.4 and 110.4 of the first jaw member 32.4 are planar in this example and abut with the clamping surfaces 116.4 and 118.4 of the second jaw member when the second ends of the jaw members are coupled together. The clamping surfaces so shaped may function to promote effective and tight sealing of the bag clamped therebetween. The clamping surfaces 116.4 and 118.4 may function to counter or inhibit the occurrence of an opposite concave curvature which may otherwise result during the manufacturing process and/or through use of the assembly 30.4 overtime.

It will be appreciated that many variations are possible within the scope of the invention described herein. It will be understood by someone skilled in the art that many of the details provided above are by way of example only and are not intended to limit the scope of the invention which is to be determined with reference to at least the following claims.

What is claimed is:

1. A bag cutting and clamping assembly comprising:

a pair of jaw members extending along a longitudinal axis, pivotally coupled together at first ends thereof and selectively coupling together via second ends thereof;

a cutting mechanism via which a bag is selectively cut, the cutting mechanism reciprocatingly mounting and being axially moveable relative to a first said jaw member and extending into a cutting channel formed by a second said jaw member; and a clamping mechanism laterally spaced-apart from the cutting channel and including one or more first pairs of clamping surfaces being laterally spaced-apart from said cutting mechanism.

2. The assembly as claimed in claim 1 wherein the clamping mechanism is laterally spaced-apart from the cutting mechanism.

3. The assembly as claimed in claim 1, wherein the cutting channel has a second pair of clamping surfaces formed by the second said jaw member and wherein the first said jaw member has a third pair of clamping surfaces between which the cutting mechanism extends, the pair of clamping surfaces of the first said jaw member abutting the pair of clamping surfaces of the second said jaw member when the second ends of the jaw members couple together.

4. The assembly as claimed in claim 3 wherein the clamping mechanism is laterally spaced-apart from the third pair of clamping surfaces of the first said jaw member and the second pair of clamping surfaces of the second said jaw member.

5. The assembly as claimed in claim 4, wherein one or more of the clamping surfaces of the second pair and/or the third pair of clamping surfaces are curved at least in part.

6. The assembly as claimed in claim 5, wherein one or more of the clamping surfaces of the second pair and/or the third pair of clamping surfaces are outwardly convex.

7. The assembly as claimed in claim 6, wherein the clamping mechanism includes a first clamping member coupled to a first of the jaw members, and wherein the first clamping member has a distal end that aligns with or extends below the cutting channel.

8. The assembly as claimed in claim 1, wherein the clamping mechanism includes a first clamping member coupled to a first of the jaw members and wherein a second of the jaw members has a clamping channel into which the clamping member extends when the second ends of the jaw members couple together.

9. The assembly as claimed in claim 8, wherein the second of the jaw members has a top and a bottom and wherein the distal end of the first clamping member is positioned between the top of the second of the jaw members and the bottom of the second of the jaw members.

10. The assembly as claimed in claim 8, wherein the first clamping member tapers in lateral section in a direction extending from the first of the jaw members towards the second of the jaw members.

11. The assembly as claimed in claim 8, wherein the first clamping member is an isosceles trapezoid in lateral section.

12. The assembly as claimed in claim 8, wherein the clamping mechanism includes a second clamping member coupled to the second of the jaw members and to which the first clamping member abuts when the second ends of the jaw members couple together.

13. The assembly as claimed in claim 10, wherein each said clamping member includes axially spaced-apart protrusions outwards from the distal end thereof.

14. The assembly as claimed in claim 8, wherein the first clamping member is shaped to snugly fit within the clamping channel of the second of the jaw members when the second ends of the jaw members couple together.

15. The assembly as claimed in claim 8, wherein the first clamping member has an outer peripheral edge that is curved at least in part.

16. The assembly as claimed in claim 8, wherein the first clamping member has an outer peripheral edge that is outwardly convex.

17. The assembly as claimed in claim 8, wherein the first of the jaw members has a clamping channel that overlaps with the clamping channel of the second of the jaw members.

18. The assembly as claimed in claim 1, wherein the cutting mechanism is positioned and moveable between the first ends of the jaw members and the second ends of the jaw members.

19. The assembly as claimed in claim 1, wherein the clamping mechanism is enclosed within the first jaw member and the second jaw member when the second ends of the jaw members couple together.

20. The assembly as claimed in claim 1, further including a region of the jaw members in which the jaw members overlap, with the jaw members in said region being shaped to abut the bag at least in part and facilitate removal of a severed portion of the bag.

21. A bag cutting and clamping assembly comprising:

a cutting mechanism via which a bag is selectively cut; and a pair of jaw members pivotally coupled together at first ends thereof and selectively coupling together via second ends thereof, the jaw members having a first clamping region and a second clamping region laterally spaced-apart from the first clamping region, the cutting mechanism being reciprocatingly mounted to a first said jaw member and extending into a second said jaw member adjacent said first clamping region, and the cutting mechanism being laterally spaced-apart from the second clamping region.

22. The assembly as claimed in claim 1, wherein at least one of the jaw members is resilient at least in part.

23. The assembly as claimed in claim 1, wherein the jaw members form three pairs of said clamping surfaces.

24. The assembly as claimed in claim 23 wherein the cutting mechanism extends between a second said pair of clamping surfaces and a third said pair of clamping surfaces of the jaw members.

25. A bag cutting and clamping assembly comprising:

a pair of jaw members pivotally coupled together at first ends thereof, the jaw members selectively coupling together to seal a bag; and a bag cutter including a first end portion reciprocatingly coupled to a first said jaw member, a second end portion slidably coupled to a second said jaw member when the jaw members are coupled together to seal the bag, and one or more blades, with the end portions of the bag cutter being shaped to inhibit access to said one or more blades.

26. The assembly as claimed in claim 25, wherein the first end portion of the bag cutter comprises a handle and wherein the second end portion of the bag cutter comprises a tongue shaped to be slidably received within an elongate groove of the second said jaw member when the jaw members are coupled together to seal the bag.

27. A bag cutting and clamping assembly comprising:

a pair of jaw members pivotally coupled together at first ends thereof, the jaw members selectively coupling together to seal a bag; and a bag cutter reciprocatingly coupling to a first said jaw member and a second said jaw member, wherein either the first said jaw member or the bag cutter includes at least one first elongate tongue, and the other of the bag cutter or the first said jaw member includes at least one first elongate groove respectively configured to receive the at least one first elongate tongue, and wherein either the second said jaw member or the bag cutter includes at least one second elongate tongue, and the other of the bag cutter or the second said jaw member includes at least one second elongate groove configured to receive the at least one second elongate tongue.

28. The assembly as claimed in claim 27, wherein the bag cutter couples to the first said jaw member via a pair of outwardly-facing channels of said other of the bag cutter or the first said jaw member, the pair of outwardly-facing channels configured to slidably receive a pair of inwardly-extending tongues of said either the first said jaw member or the bag cutter.

29. The bag cutting and clamping assembly as claimed in claim 1, wherein the clamping mechanism is implemented via the jaw members, the jaw members including the one or more pairs of clamping surfaces which abut each other when the jaw members are coupled together, with a first said clamping surface being curved at least in part.

30. The assembly as claimed in claim 29, wherein the first said clamping surface is outwardly convex.

31. The assembly as claimed in claim 30, wherein a second said clamping surface is planar.

32. The assembly as claimed in claim 29, wherein the jaw members include a second pair of the clamping surfaces, with a first said clamping surface of the second pair of clamping surfaces being outwardly convex.

33. The assembly as claimed in claim 32, wherein a second said clamping surface of the second pair of clamping surfaces is planar.

34. The assembly as claimed in claim 33, wherein the cutting mechanism is positioned between the at least one pair of clamping surfaces of the jaw members and the second pair of clamping surfaces of the jaw members.

* * * * *